United States Patent
Fang et al.

(10) Patent No.: US 11,905,406 B2
(45) Date of Patent: Feb. 20, 2024

(54) FOAMED PET COMPOSITE BOARD AND PREPARATION METHOD THEREOF

(71) Applicant: Zhejiang Tianzhen Technology Co., Ltd., Huzhou (CN)

(72) Inventors: Qinghua Fang, Huzhou (CN); Wenjin Tang, Huzhou (CN)

(73) Assignee: Zhejiang Tianzhen Technology Co., Ltd., Huzhou (CN)

( * ) Notice: Subject to any disclaimer, the term of this patent is extended or adjusted under 35 U.S.C. 154(b) by 0 days.

(21) Appl. No.: 17/832,051

(22) Filed: Jun. 3, 2022

(65) Prior Publication Data
US 2023/0312913 A1    Oct. 5, 2023

(30) Foreign Application Priority Data

Mar. 29, 2022    (CN) .......................... 202210317677.2

(51) Int. Cl.
*C08J 9/10*    (2006.01)
*C08L 67/02*    (2006.01)

(52) U.S. Cl.
CPC ............... *C08L 67/02* (2013.01); *C08J 9/103* (2013.01); *C08J 2203/04* (2013.01); *C08J 2367/02* (2013.01); *C08J 2423/06* (2013.01); *C08L 2207/20* (2013.01)

(58) Field of Classification Search
CPC ....... C08L 67/02; C08L 2207/20; C08J 9/103; C08J 2203/04; C08J 2367/02; C08J 2423/06; C08J 9/0014; C08J 2201/03; C08J 2300/30; C08J 9/0066; C08J 9/0061; C08K 2003/265; C08K 3/26; C08K 3/346; C08K 3/34; F16L 59/026
See application file for complete search history.

(56) References Cited

U.S. PATENT DOCUMENTS

2007/0090552 A1 *  4/2007  Delaviz ................... C08J 9/127
                                                            264/45.9
2007/0269647 A1 * 11/2007  Wu ........................ C08J 9/0066
                                                            521/110

FOREIGN PATENT DOCUMENTS

JP          2003003000        *  1/2003

OTHER PUBLICATIONS

Machine translation of JP 2003-003000 to Fukuvi Chem Ind Co. (Year: 2003).*

* cited by examiner

*Primary Examiner* — Irina S Zemel
(74) *Attorney, Agent, or Firm* — Fox Rothschild LLP

(57) ABSTRACT

The present disclosure provides a foamed PET composite board and a preparation method thereof. The foamed PET composite board provided is prepared from a raw material including the following components in parts by mass: 100 parts of PET, 10-20 parts of a regulator, 100-200 parts of an inorganic filler, 1-2 parts of a blowing agent, and 1-4 parts of PE wax, and the PET is recycled PET.

3 Claims, 1 Drawing Sheet

FOAMED PET COMPOSITE BOARD AND PREPARATION METHOD THEREOF

CROSS REFERENCE TO RELATED APPLICATION

This patent application claims the benefit and priority of Chinese Patent Application No. 202210317677.2, entitled "Foamed PET composite board and preparation method thereof" filed on Mar. 29, 2022, the disclosure of which is incorporated by reference herein in its entirety as part of the present application.

TECHNICAL FIELD

The present disclosure relates to the technical field of boards, and in particular to a foamed PET composite board and a preparation method thereof.

BACKGROUND ART

Polyethylene terephthalate (PET) has a chemical formula of $(C_{10}H_8O_4)_n$, and is prepared by the transesterification of dimethyl terephthalate with ethylene glycol or by the esterification of terephthalic acid with ethylene glycol to synthesize dihydroxyethyl terephthalate, followed by polycondensation. PET is crystalline saturated polyester. It is a milk-white or light yellow, highly crystalline polymer with a smooth and glossy surface, and is a quite common resin in life. PET has excellent physical and mechanical properties in a wide temperature range. Its long-term service temperature may be up to 120° C. PET has excellent electrical insulation and still good electrical properties even at high temperatures and high frequencies with relatively poor corona resistance. PET also shows desirable creep resistance, fatigue resistance, abrasion resistance and dimensional stability.

PET is mainly used in electronic appliances, such as electrical socket, electronic connector, rice cooker handle, TV deflection yoke, terminal block, interrupter casing, switch, motor fan casing, instrument mechanical parts, currency count machine parts, electric iron and fittings for electromagnetic stove; in automobile industry, such as flow control valve, carburetor cover, car window controller, pedal transmission and distribution board cover; in machinery industry, such as gear, vane, belt pulley and pump parts as well as body and wheels of wheelchair, lamp housing, illuminator housing, drainage fitting, zipper, clock parts and sprayer parts. PET may be spun into polyester fibers, namely terylene. PET may be made into thin films to be used in substrates of tape, video and filmstrip, insulating films and product packaging. As plastic, PET may be blown into various bottles, such as coke bottle and mineral water bottle. PET may also be used as electronic appliance parts, bearings, gears and the like.

In the prior art, the extensive use of PET leads to a waste of PET, failing to realize the resource utilization of PET.

SUMMARY

In view of this, an objective of the present disclosure is to provide a foamed PET composite board and a preparation method thereof. In the present disclosure, recycled PET is used to prepare a board, which realizes the resource utilization of PET.

To achieve the above objective, the present disclosure provides the following technical solutions:

The present disclosure provides a foamed PET composite board, prepared from a raw material including the following components in parts by mass:

100 parts of PET, 10-20 parts of a regulator, 100-200 parts of an inorganic filler, 1-2 parts of a blowing agent, and 1-4 parts of PE wax, wherein the PET is recycled PET.

In some embodiments, the foamed PET composite board is prepared from a raw material including the following components in parts by mass:

100 parts of the PET, 14-16 parts of the regulator, 140-160 parts of the inorganic filler, 1-2 parts of the blowing agent, and 2-3 parts of the PE wax.

In some embodiments, the foamed PET composite board is prepared from a raw material including the following components in parts by mass:

100 parts of the PET, 15 parts of the regulator, 150 parts of the inorganic filler, 2 parts of the blowing agent, and 3 parts of the PE wax.

In some embodiments, the inorganic filler is calcium carbonate and/or talc powder.

In some embodiments, when the inorganic filler is calcium carbonate and talc powder, a mass ratio of calcium carbonate to talc powder is in a range of (1-9):(9-1).

In some embodiments, the blowing agent is AC blowing agent.

In some embodiments, the regulator may be a compound ACR foaming regulator.

The present disclosure further provides a preparation method of the foamed PET composite board according to the above technical solutions, including:

mixing the PET, the regulator, the inorganic filler, the blowing agent and the PE wax, and then subjecting to melt extrusion, plastic fixing and calendaring molding in sequence to obtain the foamed PET composite board.

In some embodiments, the melt extrusion is conducted at a temperature in a range of 200-260° C.

The present disclosure provides a foamed PET composite board, prepared from a raw material including the following components in parts by mass: 100 parts of PET, 10-20 parts of a regulator, 100-200 parts of an inorganic filler, 1-2 parts of a blowing agent, and 1-4 parts of PE wax (polyethylene wax), wherein the PET is recycled PET.

In the present disclosure, recycled PET is used to realize the resource utilization of PET, solving the problem of PET waste present in the art.

In the present disclosure, the foamed PET composite board with properties of high strength, sound insulation and thermal insulation, and without pollution is obtained by accurately limiting the amounts of the PET, the regulator, the inorganic filler, the blowing agent and the PE wax.

The present disclosure further provides a preparation method of the foamed PET composite board according to the above technical solutions. The preparation method is simple and fast, with fewer steps, and is beneficial to realize industrial production.

DETAILED DESCRIPTION OF THE EMBODIMENTS

Figure 1:
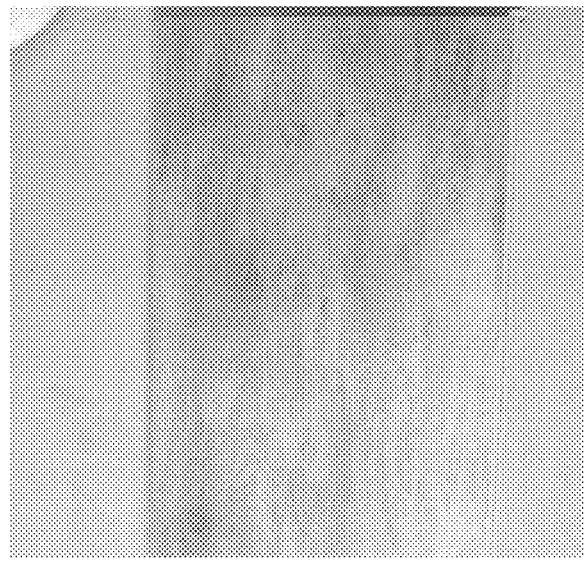
FIG. 1 is a physical photo of the foamed PET composite board prepared according to Example 1.

The present disclosure provides a foamed PET composite board, which is prepared from a raw material including the following components in parts by mass:

100 parts of PET, 10-20 parts of a regulator, 100-200 parts of an inorganic filler, 1-2 parts of a blowing agent, and 1-4 parts of PE wax, wherein the PET is recycled PET.

In the present disclosure, unless otherwise specified, all the raw materials used are commercially available products in the art.

In the present disclosure, the PET may preferably be recycled PET, and more preferably PET recycled from PET bottle chips.

In the present disclosure, in some embodiments, the recycling process of the PET bottle chips may include:

separating a body of a PET bottle from a cap and a label, and then crushing, cleaning and drying successively.

In some specific embodiments, the steps are performed as follows:

step 1, picking and sorting various PET bottle chips and tearing off labels on the outside, most of which are OPP (o-phenylphenol) and some are PVC (polyvinyl chloride) shrink films and have to be stripped away firstly;

step 2, conducting a crushing process, during which rinsing is carried out with water to remove dirt from the various PET bottle chips;

step 3, placing obtained chips in a steam treatment device and adding sodium hydroxide (caustic soda flakes) to remove greases and other stubborn impurities;

step 4, washing with clean water, spin-drying to remove the remaining water and bagging, and then drying in a vacuum oven; and step 5, smashing into pieces.

Based on the parts by mass of the PET, the foamed PET composite board may preferably include 1-2 parts of the blowing agent, and more preferably 2 parts.

In the present disclosure, in some embodiments, the blowing agent may be AC blowing agent.

Based on the parts by mass of the PET, the foamed PET composite board may preferably include 14-16 parts of the regulator, and more preferably 15 parts.

In the present disclosure, in some embodiments, the regulator may be a compound ACR foaming regulator that has an effect of increasing solution strength.

Based on the parts by mass of the PET, the foamed PET composite board may preferably include 140-160 parts of the inorganic filler, and more preferably 150 parts.

In the present disclosure, in some embodiments, the inorganic filler may be calcium carbonate and/or talc powder.

In the present disclosure, when the inorganic filler preferably is calcium carbonate and talc powder, a mass ratio of calcium carbonate to talc powder may preferably be in a range of (1-9):(9-1), and more preferably 1:1.

In the present disclosure, in some embodiments, the inorganic filler may have a particle size of 200-400 mesh.

Based on the parts by mass of the PET, the foamed PET composite board may preferably include 2-3 parts of PE wax, and more preferably 3 parts.

In some specific embodiments, the foamed PET composite board may be prepared from a raw material including the following components in parts by mass:

100 parts of the PET, 15 parts of the regulator, 150 parts of the inorganic filler, 2 parts of the blowing agent, and 3 parts of the PE wax.

The present disclosure further provides a method for preparing the foamed PET composite board according to the above technical solutions, including the following steps:

mixing PET, a regulator, an inorganic filler, a blowing agent and PE wax, and subjecting to melt extrusion, plastic fixing and calendaring molding in sequence to obtain the foamed PET composite board.

In the present disclosure, the melt extrusion may preferably be conducted at a temperature in a range of 200-260° C., and more preferably 240° C.

There are no special limits to the specific processes of the plastic fixing and calendaring molding in the present disclosure, and the processes well known to those skilled in the art may be used.

To further describe the present disclosure, hereinafter, the foamed PET composite board and the preparation method thereof provided in the present disclosure will be described in detail with reference to examples, which should not be construed as limiting the protection scope of the present disclosure.

Raw materials for preparing the foamed PET composite boards according to Examples 1 to 5 are shown in Table 1.

TABLE 1

Raw materials for preparing foamed PET composite boards according to Examples 1 to 5 (part by mass)

| | Recycled PET | Regulator | Calcium carbonate | Talc powder | AC blowing agent | PE wax |
|---|---|---|---|---|---|---|
| Example 1 | 100 | 10 | 40 | 60 | 1 | 1 |
| Example 2 | 100 | 14 | 70 | 70 | 2 | 2 |
| Example 3 | 100 | 15 | 75 | 75 | 2 | 3 |
| Example 4 | 100 | 16 | 90 | 70 | 1 | 3 |
| Example 5 | 100 | 10 | 50 | 50 | 2 | 4 |

A preparation method of the foamed PET composite boards according to Examples 1 to 5 was performed as follows:

Recycling PET from PET bottle chips:

step 1, various PET bottle chips were picked and sorted, and labels on the outside were torn off, wherein most of the labels were OPP and some were PVC shrink films that had to be stripped away firstly;

step 2, a crushing process was conducted, during which rinsing was performed with water to remove dirt from the various PET bottle chips obtained from step 1;

step 3, the chips obtained from step 2 were placed in a steam treatment device, and sodium hydroxide (caustic soda flakes) was added to remove greases and other stubborn impurities;

step 4, the chips obtained from step 3 were washed with clean water, spin-dried to remove the remaining water and bagged, and then were dried in a vacuum oven; and step 5, the chips obtained from step 4 were smashed into pieces.

The recycled PET, the regulator, the inorganic filler, the blowing agent and PE wax were mixed, and then subjected to melt extrusion (conducted at 240° C.), plastic fixing and calendaring molding successively, obtaining a foamed PET composite board.

Figure 2:
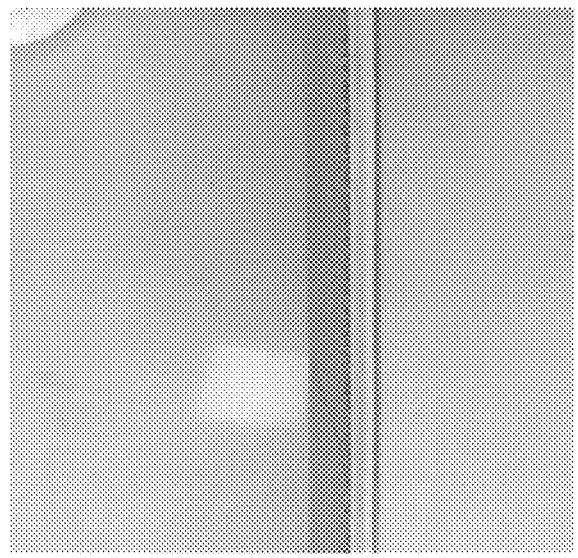
FIG. 2 is a physical photo of the foamed PET composite board prepared according to Example 2.

FIG. 1 is a physical photo of the foamed PET composite board prepared according to Example 1; FIG. 2 is a physical photo of the foamed PET composite board prepared according to Example 2.

The foaming ratios of the raw materials of Examples 1 to 5 during the melt extrusion were 0.8-, 0.86-, 1.0-, 0.9-, and 0.94-times, respectively.

The hardness, static load, bending strength and noise reduction coefficient were tested for the foamed PET composites prepared according to Examples 1 to 5. Herein, the noise reduction coefficient refers to GBJ47-1983. Results are shown in Table 2.

TABLE 2

The performance testing results of the foamed PET composites prepared according to Examples 1 to 5

|  | Hardness/D | Static load/mm | Bending strength/MPa | Noise reduction coefficient |
|---|---|---|---|---|
| Example 1 | 53 | 0.15 | 185 | 0.96 |
| Example 2 | 47 | 0.16 | 167 | 0.93 |
| Example 3 | 45 | 0.18 | 158 | 0.89 |
| Example 4 | 51 | 0.14 | 203 | 0.95 |
| Example 5 | 43 | 0.19 | 169 | 0.94 |

The examples as described above are merely the preferred embodiments of the present disclosure, and are not intended to limit the present disclosure in any form. It should be understood that for those skilled in the art, several improvements and modifications could be made without departing from the principle of the present disclosure, and those improvements and modifications shall be within the protection scope of the present disclosure.

What is claimed is:

1. A foamed PET composite board, which is prepared from a raw material consisting of the following components in parts by mass:

100 parts of a PET, 16 parts of a regulator, 160 parts of an inorganic filler, 1 part of a blowing agent, and 3 parts of a PE wax, wherein respective amounts of the PET, the regulator, the inorganic filler, the blowing agent and the PE wax are selected so that the hardness of the PET composite board is 51 D and the bending strength is 203 MPa, wherein the inorganic filler is calcium carbonate and talc powder, and a mass ratio of calcium carbonate to talc powder is 9:7;

wherein the blowing agent is azodicarbonamide (AC) blowing agent; and wherein the regulator is a compound acrylate (ACR) foaming regulator.

2. A method for preparing the foamed PET composite board according to claim 1, including:

mixing the PET, the regulator, the inorganic filler, the blowing agent and the PE wax, and then subjecting to melt extrusion, plastic fixing and calendering molding in sequence to obtain the foamed PET composite board, wherein the respective amounts of the PET, the regulator, the inorganic filler, the blowing agent and the PE wax are selected to improve achieve the hardness being 51 D and the bending strength being 203 MPa, sound insulation and thermal insulation of the foamed PET composite board.

3. The method according to claim 2, wherein the melt extrusion is conducted at a temperature in a range of 200-260° C.

* * * * *